United States Patent [19]

Gaughan

[11] Patent Number: 5,714,684
[45] Date of Patent: Feb. 3, 1998

[54] TEST PLAT ADAPTER FOR MANUAL SINGLE CAR TESTER

[75] Inventor: Edward W. Gaughan, Irwin, Pa.

[73] Assignee: Westinghouse Air Brake Co., Wilmerding, Pa.

[21] Appl. No.: 622,466

[22] Filed: Mar. 25, 1996

[51] Int. Cl.⁶ .................................................. G01M 3/02
[52] U.S. Cl. ............................ 73/121; 73/39; 73/129; 340/453; 364/424.024
[58] Field of Search ............................ 73/39, 121, 122, 73/126, 129, 861.42; 340/452, 453, 454; 364/426.01, 424.024

[56] References Cited

U.S. PATENT DOCUMENTS

| | | | |
|---|---|---|---|
| 2,509,816 | 5/1950 | Elson | 73/39 |
| 2,637,201 | 5/1953 | Meier | 73/39 |
| 2,674,121 | 4/1954 | Gorman | 73/39 |
| 2,993,199 | 7/1961 | Browne et al. | 73/39 |
| 3,531,981 | 10/1970 | Pommer | 73/39 |
| 3,727,453 | 4/1973 | Rees | 73/39 |
| 3,958,454 | 5/1976 | Rasch | 73/121 |
| 4,100,792 | 7/1978 | Leiber | 73/39 |
| 4,156,864 | 5/1979 | Ingram | 340/452 |
| 4,361,362 | 11/1982 | Fauck | 73/39 |
| 4,440,015 | 4/1984 | Hann | 73/121 |
| 4,513,604 | 4/1985 | Frantz et al. | 73/39 |
| 4,847,770 | 7/1989 | Kane et al. | 73/129 |
| 5,111,827 | 5/1992 | Rantala | 73/861.42 |
| 5,113,694 | 5/1992 | Sich | 73/121 |
| 5,592,384 | 1/1997 | Wolf | 364/424.024 |

FOREIGN PATENT DOCUMENTS

1161054  1/1964  Germany ..................... 73/39

Primary Examiner—George M. Dombroske
Attorney, Agent, or Firm—Gary J. Falce

[57] ABSTRACT

For use with control valves having test ports via which various pressures may be accessed in performing an automatic single car brake test, there is provided a test plate via which such control valves may be conditioned to obtain faster charging of the brake equipment when performing the brake test with a manual single car tester. The test plate interconnects the test ports such that the test pressure supplied to the car brake pipe charges the brake equipment in by-pass of the charging choke in the control valve.

25 Claims, 8 Drawing Sheets

TEST PLAT ADAPTER FOR MANUAL SINGLE CAR TESTER

BACKGROUND OF THE INVENTION

The present invention relates to test equipment for carrying out various test procedures by which a general check on the condition of the brake equipment on a railroad freight car can be made. More particularly, this invention relates to an arrangement to facilitate the testing procedure when using a manual single car test device on a freight car that is equipped with a control valve having test access ports to accommodate an automatic single car test device.

The aforementioned automatic single car test device requires that a railroad car have a control valve with test ports through which air may be accessed from different locations within the control valve in order to be analyzed in accordance with the automatic test procedure. Conversely, a manual single car test device is capable of conducting the prescribed tests on cars equipped with the industry standard AB, ABD, ABDW and ABDX control valves, as well as such control valves when modified to provide test ports for automatic testing. Such control valves having test access ports for purposes of automatic testing have been disclosed in U.S. Pat. No. 5,451,099, U.S. Pat. No. 5,480,218 and U.S. patent application Ser. No. 08/547,929, all of which are assigned to the Westinghouse Air Brake Company.

The manual single car test device is adapted to be coupled to the brake pipe of a freight car and enables the testing of the car brake equipment to be conducted without removal of any components from the car. A source of compressed air is supplied to the car brake pipe via a regulator valve of the test device, which may be adjusted to supply a pre-determined test pressure for charging the brake equipment. This test pressure is connected to the brake equipment via a charging choke in the car control valve device. Specifically, this charging choke is located in the brake pipe passage at the face of the service portion and is sized to control the charging rate of the auxiliary and emergency reservoirs in actual service.

It will be appreciated that during manual testing of the car brake equipment, this charging choke delays the time required to charge the equipment to the appropriate test pressure and thus unduly increases the time required to conduct the testing.

Summary of the Invention

It is the object of the present invention to reduce the time required to conduct the single car brake test when employing a manual test device in such cases where the car control valve is provided with test ports via which different fluid pressure channels within the control valve may be accessed.

It is another object of the invention to perform a brake cylinder leakage test during such time as the car brake system is being charged via the manual single car tester.

In carrying out these objectives, there is provided for a standard, single car tester a test plate for use when performing a brake test on a car equipped with a car control valve having a plurality of test ports via which access may be had to at least a first flow path subject to brake pipe pressure and a second flow path subject to auxiliary reservoir pressure charged via a choke in the first flow path. The brake pipe test port accesses the first flow path at a location upstream of the charging choke, while the auxiliary reservoir test port accesses the second flow path at a location downstream of the charging choke. The test plate is affixed to the control valve such as to interconnect the test ports. In this manner, the test pressure supplied via the single car tester can charge the brake equipment in bypass of the charging choke to reduce the time required to charge the brake equipment to a predetermined test pressure.

Another test port that accesses a third flow path between the second flow path and the car brake cylinder may also be interconnected with the brake pipe test port when the test plate is affixed to the control valve. This allows the brake cylinder to be charged with test pressure in order to perform a leakage test during the charging process.

Still another test port that accesses a fourth flow path between the second flow path and an emergency reservoir may be interconnected with the brake pipe test port when the test plate is affixed.

Cut-out cocks or the like are employed with the test plate to direct the test pressure to the appropriate flow paths, as desired. Pressure gages may also be provided to give a readout of the pressure supplied to the respective flow paths.

Other objects and advantages of the invention will become apparent from the following description of certain present preferred embodiments thereof shown in the drawings.

DETAILED DESCRIPTION OF THE PREFERRED EMBODIMENT

Figure 2:
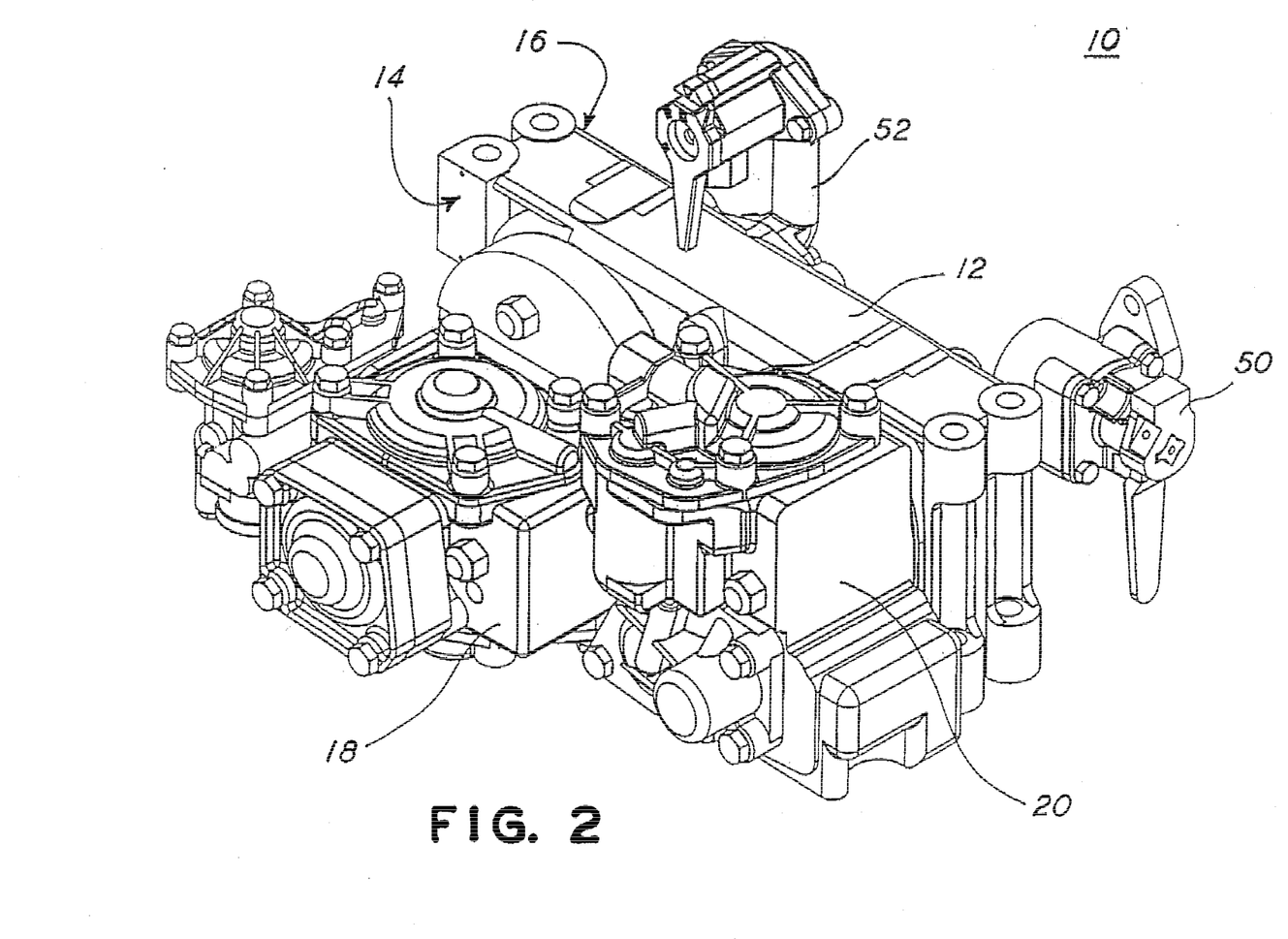
FIG. 2 is a perspective view of a preferred control valve showing a pipe bracket portion, an emergency portion and a service portion.

FIG. 2 shows a railway freight control valve 10 incorporating a pipe bracket portion 12 having a first side 14 and a second side 16 directed oppositely to one another. The pipe bracket portion first side 14 has a service portion 18 and an emergency portion 20 mounted thereto and is thus commonly referred to as a single-sided pipe bracket. Both the service and emergency portions 18, 20 as shown are mounted by any suitable means such as by using threaded bolts or studs. The service portion 18 and emergency portion 20 are mounted upon opposite ends of first side 14. The service portion 18 and emergency portion 20 are spaced apart a selected amount such that an area or space is provided between the service portion 18 and emergency portion 20 on the first side 14 of pipe bracket portion 12.

A brake pipe connection (not shown) connects a brake pipe to the pipe bracket portion 12 and is provided at the second side 16 of the pipe bracket portion 12. A brake cylinder line, a brake cylinder retaining valve line, an emergency reservoir line and an auxiliary reservoir line (each not shown) are also connected to the second side 16 of the pipe bracket portion 12, by any suitable means, such as by flanged fittings. A retainer valve 52 and a dirt collector 50 are shown connected to the pipe bracket portion second side 16.

Figure 3:
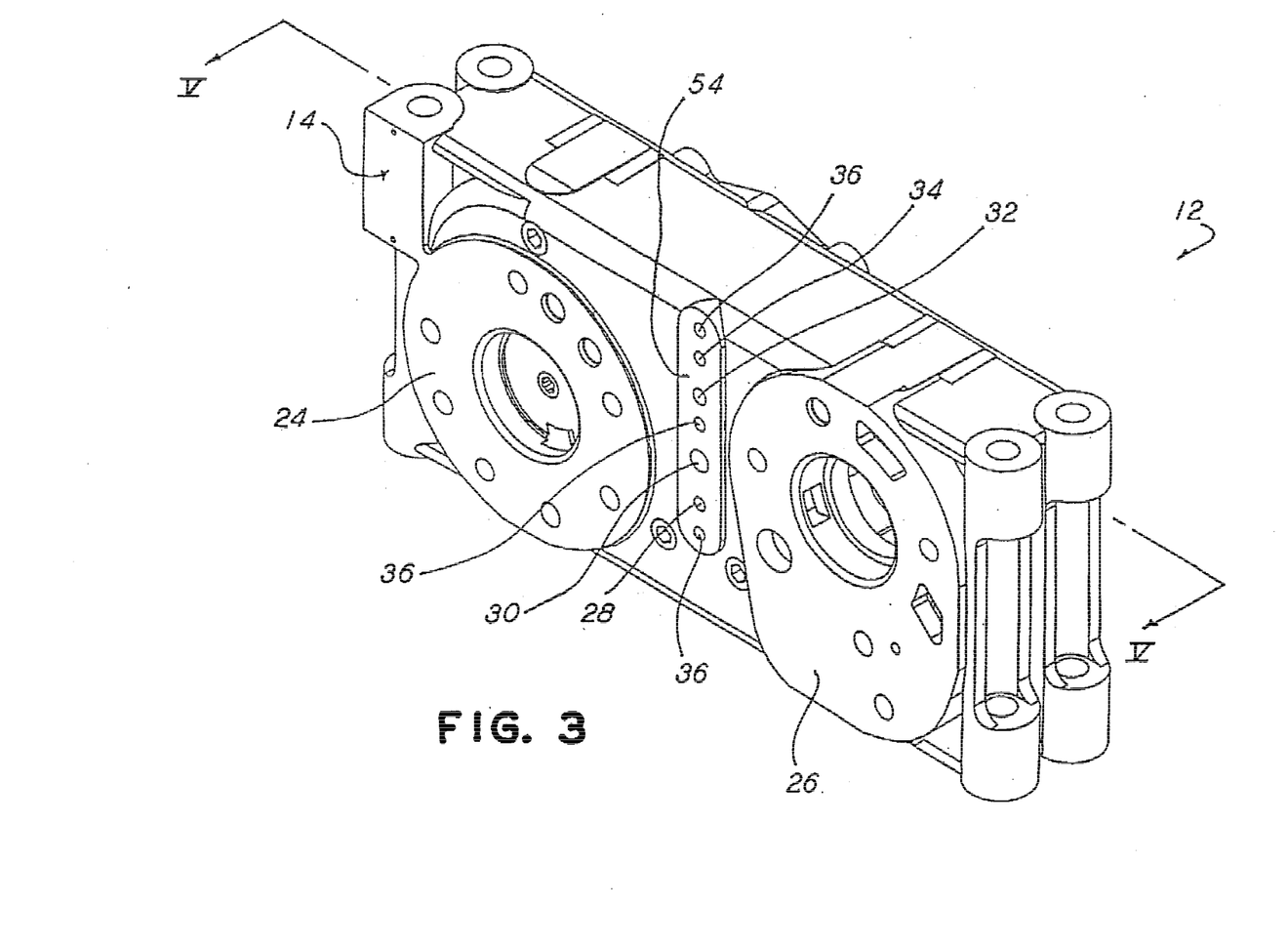
FIG. 3 is a perspective view of a first side of the pipe bracket portion with the emergency portion and the service portion detached therefrom.

Referring next to FIG. 3, the preferred pipe bracket portion 12 is shown having the service portion 18 and the emergency portion 20 detached therefrom. The service portion 18 is mountable to a mounting surface 24 on the pipe bracket portion first side 14 and the emergency portion 20 is mountable to a mounting surface 26 on the pipe bracket portion first side 14. Thus, between the mounting surface 24 and the mounting surface 26 lies an area on pipe bracket portion first side 14 having four test ports 28, 30, 32, 34. Test port 28 connects to the brake cylinder passageway, test port 30 to the brake pipe passageway, test port 32 to the auxiliary reservoir passageway and test port 34 to the emergency reservoir passageway (the passageways are not shown in FIG. 3). The test ports 28, 30, 32, 34 are located upon a mounting surface or boss 54 of the pipe bracket portion 12. The boss 54 is preferably integral with the pipe bracket portion 12 and its surface is preferably planar. Threaded screw holes 36 are also preferably provided on boss 54.

Figure 4:
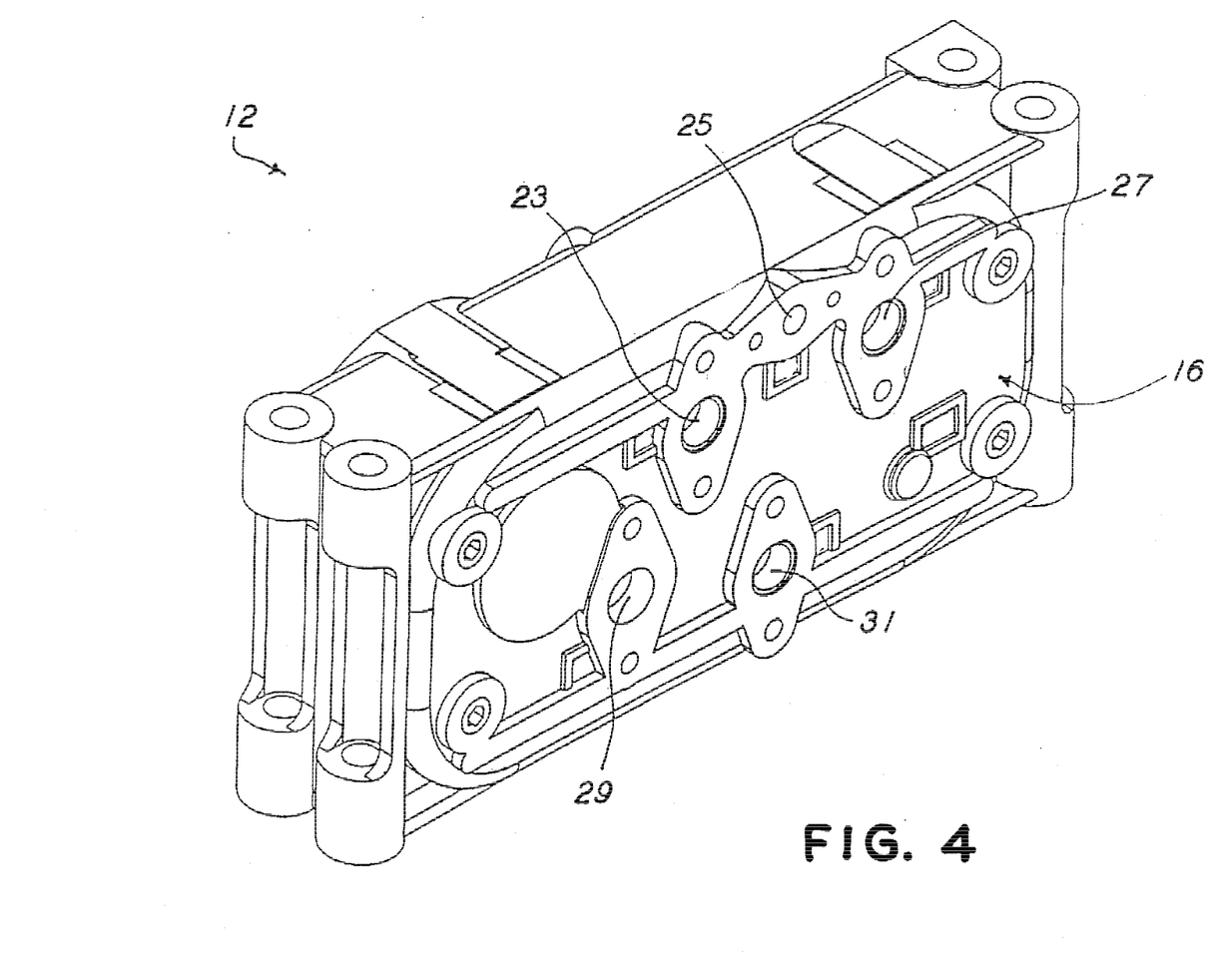
FIG. 4 is a perspective view of a second side of the pipe bracket portion with the pipe connections detached therefrom.

The second side 16 of the preferred pipe bracket portion 12 is shown in FIG. 4. In FIG. 4, the connections to the auxiliary reservoir, the retainer, the emergency reservoir, the brake pipe and the brake cylinder (not shown) are detached from the pipe bracket portion 12. The auxiliary connection is connected to the pipe bracket portion at location 23, the retainer is connected at location 25, the emergency reservoir at location 27, the brake pipe connection at location 29, and the brake cylinder connection at location 31.

Figure 5:
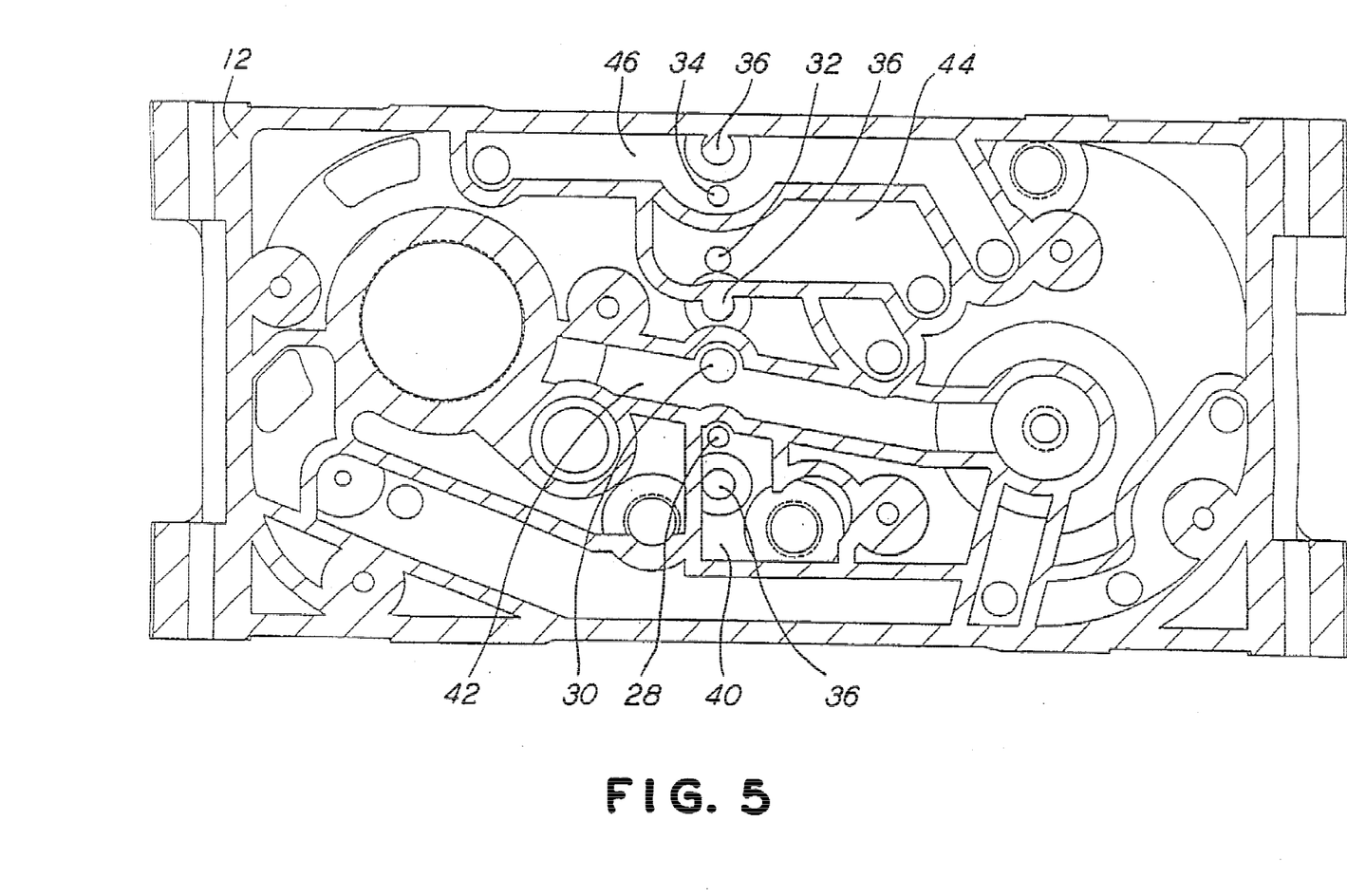
FIG. 5 is a cross-sectional view of the pipe bracket portion taken along line A—A of FIG. 3.

FIG. 5 shows a cross-sectional view of the pipe bracket portion 12 taken along line A—A of FIG. 3 in which the various internal passageways can be seen. The brake cylinder test port 28 is shown opening to the brake cylinder passageway 40, which is in turn connected to a brake cylinder line (not shown) leading to a brake cylinder. The brake pipe test port 30 is shown opening to the brake pipe passageway 42, which is in turn connected to a brake pipe line (not shown) leading to the brake pipe. The auxiliary reservoir test port 32 is shown opening to auxiliary reservoir passageway 44, which is in turn connected to an auxiliary reservoir line (not shown) leading to the auxiliary reservoir. The emergency reservoir test port 34 is shown opening to the emergency reservoir passageway 46, which is in turn connected to an emergency reservoir line (not shown) leading to the emergency reservoir. In this way, the test ports 28, 30, 32, 34 communicate directly to the respective passageways and to the respective air lines. Therefore, the fluid pressure in each air line may be accessed via test ports 28, 30, 32, 34.

Figure 6:
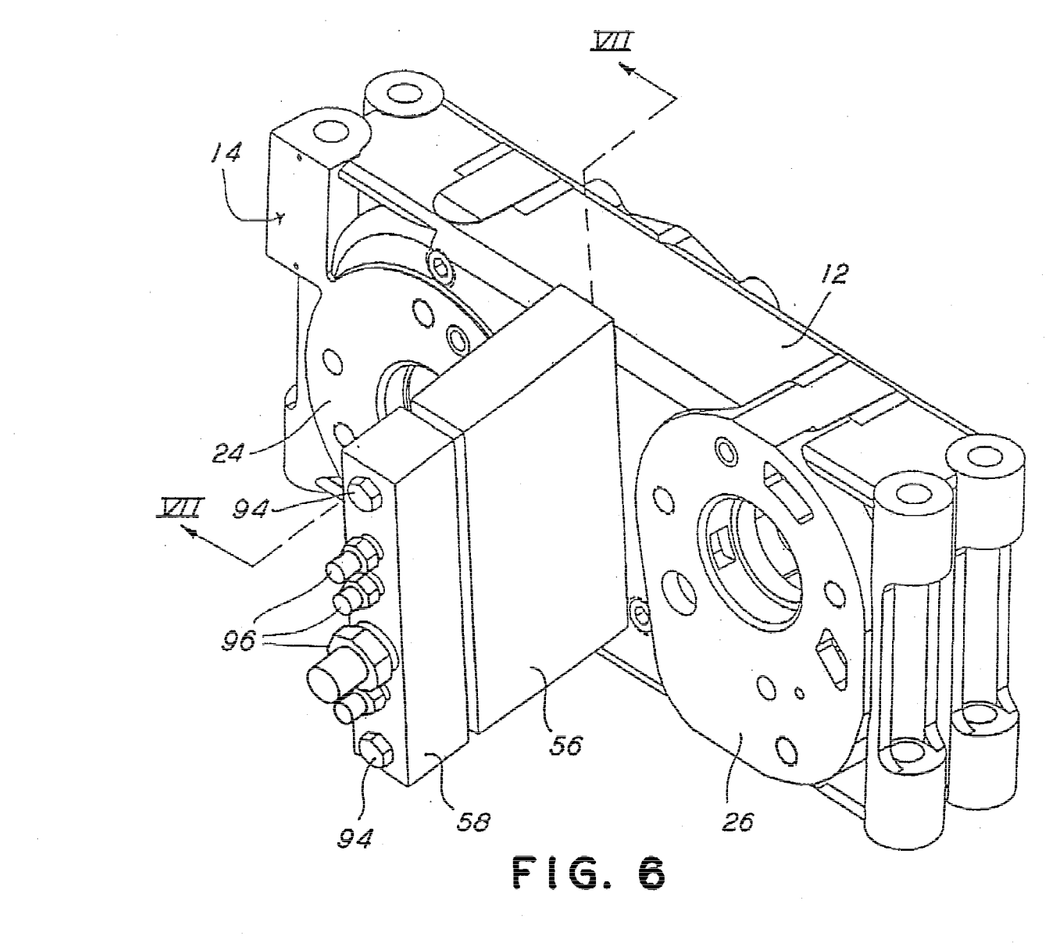
FIG. 6 is a view of the pipe bracket portion similar to FIG. 3 with an access housing and a test plate of the present invention attached to the first side thereof.
Figure 7:
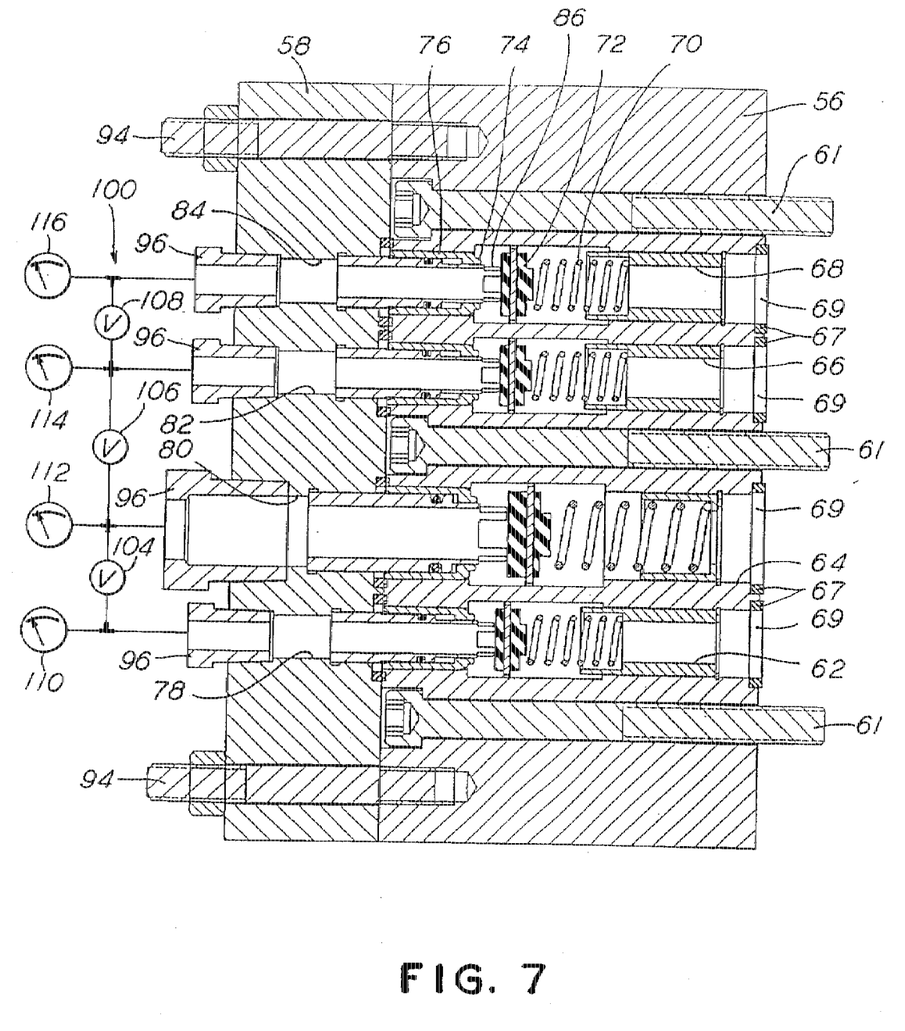
FIG. 7 is a cross-sectional view of the access housing and test plate taken along line B—B of FIG. 6.

Referring next to FIGS. 6 and 7, an access housing 56 and a test plate 58 are shown attached to the pipe bracket portion 12. As can be seen, the access housing 56 is mounted upon the pipe bracket portion first side 14 at boss 54. The access housing 56 may be affixed to the pipe bracket portion first side 14 by any convenient means such as by housing screws 61 (FIG. 7). Preferably, the access housing 56 has a planar surface which mates with the planar surface of boss 54. It is further preferred that a gasket or O-ring seals 67 (FIG. 7) be provided between the access housing 56 and the pipe bracket portion first side 14.

The access housing 56 has channels 62, 64, 66, 68 for communicating with the respective test ports 28, 30, 32, 34.

The housing channels 62, 64, 66, 68 have opposed ends, with one end of each channel 62, 64, 66, 68 being bordered by an access end 69. Each access end 69 of the housing channels 62, 64, 66, 68 is sized and configured to connect to and sealably engage with the respective test ports 28, 30, 32, 34. The end of each of the housing channels opposite to each receiving end 69 have a receiving chamber 76. Furthermore, the housing channels 62, 64, 66, 68 are positioned in the access housing 56 such that when the access housing 56 is placed in contact with boss 54, the access ends 69 of the housing channels 62, 64, 66, 68 correspond in location to the respective test ports, 28, 30, 32, 34 of the pipe bracket portion first side 14.

Intermediate a receiving chamber 76 and the access end 69 of each housing channel 62, 64, 66, 68, preferably at a shouldered end of the receiving chamber 76, is a valve seat 74. Access housing 56 has valve means provided therein. Preferably, a number of valve means are provided within the access housing 56, such that a respective valve means is provided within each of the housing channels 62, 64, 66, 68. Each such valve means is preferably comprised of a spring 70 seated within the housing channel, and a valve element 72 engageable with the spring 70 which together operate in connection with the valve seat 74. Valve elements 72 are each movable within their respective housing channels 62, 64, 66, 68 and are biased by the springs 70 into contact with the valve seats 74. With valve elements 72 in biased contact with the respective valve seats 74, the valve means is said to be in a closed position, in which fluid from the test ports 28, 30, 32, 34 cannot pass through valve seats 74 into the receiving chambers 76 of each housing channel 62, 64, 66, 68. Thus, when the valve means is in the closed position, no fluid pressure is lost through the access housing 56.

As can also be seen in FIGS. 6 and 7, test plate 58 may be attached to access housing 56 when it is desired to access the fluid pressure of passageways 40, 42, 44, 46. Test plate 58 and access housing 56 may be connected by any convenient means such as by screws 94. Test plate 58 has channels 78, 80, 82, 84 provided therethrough, each bounded at one end by a respective actuator member 86, which projects outward from one end of the test plate 58. The opposite ends of channels 78, 80, 82, 84, are each interconnected by a respective fitting 96. Adaptor channels 78, 80, 82, 84 are located along test plate 58 such that when the adaptor 58 is positioned for mounting adjacent the access housing 56, each test plate channel 78, 80, 82, 84 corresponds in position and location with each respective housing channel 62, 64, 66, 68. Each of the test plate actuator members 86 are sized and configured to fit inside and sealably engage with each respective receiving chamber 76 of the access housing channels 62, 64, 66, 68.

When each test plate actuator member 86 is inserted within its respective receiving chamber 76 of the access housing channels 62, 64, 66, 68, each actuator member 86 contacts a respective valve element 72. As the actuator members 86 are inserted fully within each receiving chamber 76, the actuator members 86 push each valve element 72, overcoming the spring bias and moving the valve element 72 back away from its respective valve seat 74 into an open position. The actuator members 86 are sized and configured so that when they are inserted within the receiving chambers 76, fluid may flow between access housing channels 62, 64, 66, 68 and the respective test plate channels 78, 80, 82 and 84. Fluid pressure communication is thus established between the respective pipe bracket passageways 40, 42, 44, 46, the respective test ports 28, 30, 32, 34, the respective access housing channels 62, 64, 66, 68, the respective test plate channels 78, 80, 82, 84 and the respective fittings 96.

As shown in FIG. 7, the respective fittings 96 are part of a piping network 100 that is interconnected between the respective pipe fittings 96. A cut-out cock 104 is located in the pipe network 100 between the pipe fittings 96 associated with passages 78, 80; another cut-out cock 106 is located in pipe network 100 between the pipe fittings 96 associated with passages 80, 82; and another cut-out cock 108 is located in pipe network 100 between the pipe fittings 96 associated with passages 82, 84. These cut-out cocks 104, 106 and 108 are normally closed so that when test plate 58 is connected to access housing 56, fluid pressure communication between the different test ports and the passageways interconnected therewith via piping network 100 is interrupted. The respective fittings 94 are further connected via piping network 100 to pressure gages 110, 112, 114 and 116.

In normal service of a railroad car, test plate 58 is preferably replaced by a cover plate (not shown) to prevent dirt and moisture from gaining access to the check valve area of access housing 56.

Figure 1:
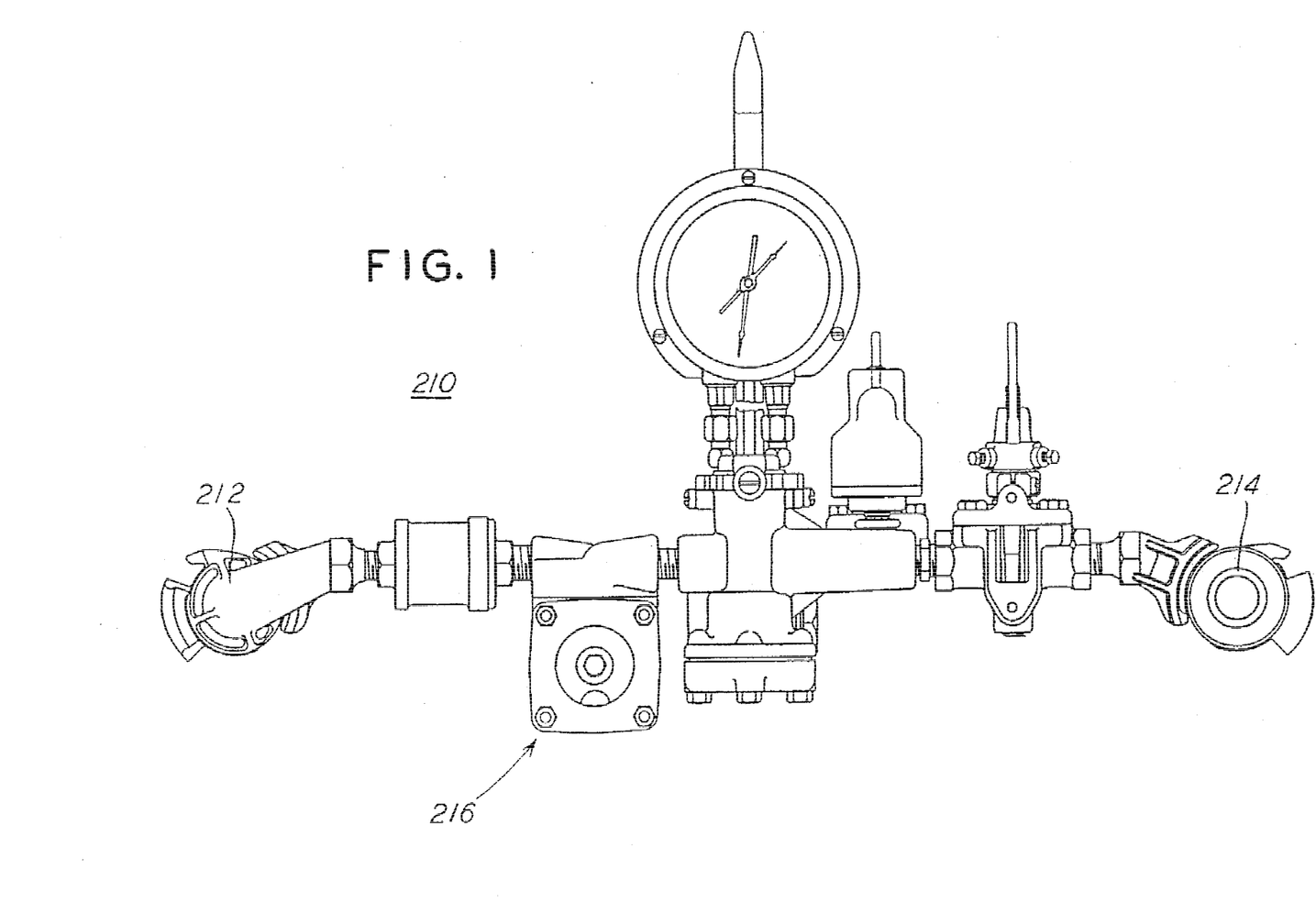
FIG. 1 is an assembly outline view of a conventional, manually operated, single car test device with which the present invention is employed.

When it is desired to conduct a single car test of the brakes of a railroad car, such testing may be accomplished by means of an automatic single car test device, as disclosed in allowed U.S. Pat. Ser. No. 08/396,815; or alternatively, by means of a standard, manually operated single car test device 210, as shown in FIG. 1. It is in conjunction with this manual test device 210 that the present invention has utility. Test device 210 is connected by conventional "gladhand" type couplings 212, 214 between a source of compressed air and the car brake pipe, in the usual, well-known manner. At the same time, the cover plate is removed from its connection with the access housing 56 on pipe bracket portion 12 of the car control valve 10. In accordance with the present invention, test plate 58 is affixed to access housing 56, as by bolts 94 (FIG. 7) in place of the cover plate. At least cock 106 is opened and preferably cock 108 is also opened.

In the course of conducting the single car test, compressed air is supplied to the car brake pipe via the single car test device 210 at a predetermined test pressure, as set by adjustment of the test device regulator valve 216. The compressed air supplied to the car brake pipe flows via the car branch pipe 122 to pipe bracket portion 12, as represented diagrammatically in FIG. 8.

Figure 8:
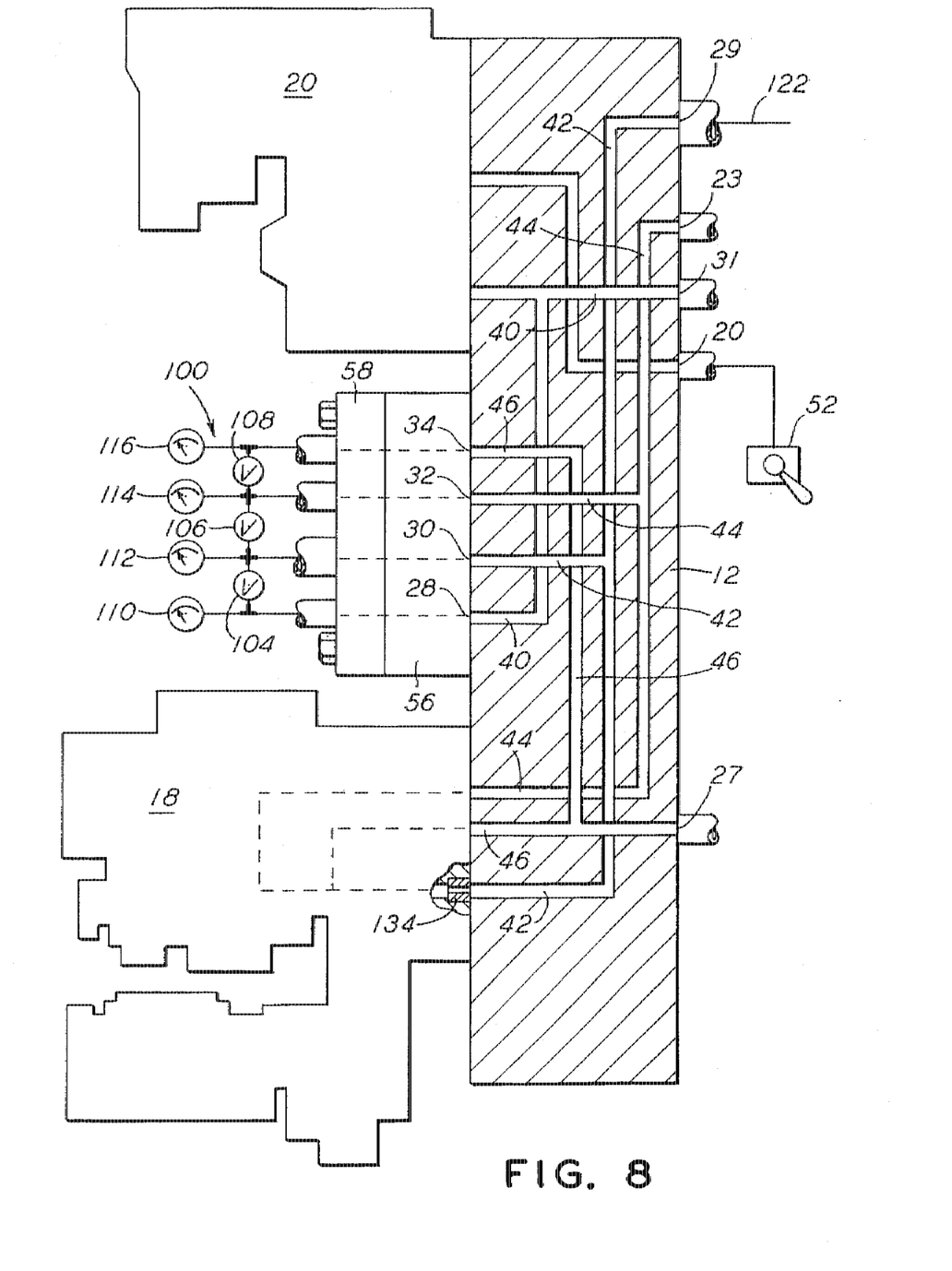
FIG. 8 is a diagrammatic view of the pipe bracket portion and test plate illustrating the passage arrangement therein.

From branch pipe 122, air flows to passage 42 leading to choke 134. During service operation, this choke controls the rate at which brake pipe pressure is supplied from passage 42 to the auxiliary reservoir via service portion 18 and passage 44, and to the emergency reservoir via service portion 18 and passage 46. It will be understood that without applicant's invention, i.e., test plate 58, springs 70 maintain check valve elements 72 seated within access housing 56, thereby interrupting communication between test ports 32, 34, 36 and 38. Consequently, compressed air from brake pipe passage 42 would be forced to flow via choke 134 to charge the auxiliary and emergency reservoirs when conducting a single car test with manual test device 210. While such controlled flow is desirable in normal operation from a stability standpoint, it is preferable and desirable to charge the brake equipment to the pre-determined test pressure without any undue delay during the single car brake test procedure.

It will now be appreciated that in utilizing test plate 58 by affixing to access housing 56, as explained, such that check valve elements 70 are unseated, and opening cut-out cocks 106 and 108, communication is established between test ports 30, 32 and 34 and thus between brake pipe passage 42 and the respective auxiliary reservoir and emergency reservoir passages 44 and 46. Consequently, compressed air in brake pipe passage 42 is free to flow directly from test port 30, to piping network 100 via access housing channel 64 and test plate channel 80. In that cut-out cock 104 is closed and cut-out cocks 106 and 108 are open, the compressed air is routed to test plate channels 82 and 84, to access housing channels 66 and 68, and through test ports 32 and 34 to auxiliary reservoir passage 44 and emergency reservoir passage 46, in bypass of choke 134. In by passing choke 134, the car brake equipment is charged without undue delay via the single car test device from a source of compressed air. In accordance with the present invention, the charging time has been reduced by as much as 40%, thus making it possible to conduct the single car test considerably faster than heretofore possible when employing a manual single car test device 210.

During such charging of the car brake equipment to the predetermined test pressure, a brake cylinder leakage test may be performed by setting the car retainer valve 52 to its "high pressure" retention position. As is well known in the railroad braking industry, such "high pressure" retention positioning of a standard brake cylinder pressure retainer valve typically retains 20 psi in the brake cylinder, when a brake application is released. Thus, in setting the car retainer valve in its "high pressure" position and opening cut-out cock 104 in conjunction with the already open cut-out cocks 106 and 108, as above explained, compressed air supplied to piping network 100 intermediate cut-out cocks 104 and 106 is also free to flow to the car brake cylinder (not shown) via test plate channel 78, access housing channel 62, test port 28 and brake cylinder passage 40 in pipe bracket portion 12.

When brake cylinder pressure increases to the setting of the car retainer valve (20 psi), cut-out cock 104 is closed and pressure gage 110 is monitored. A drop in pressure noted at pressure gage 110 is indicative of a brake cylinder leakage condition.

Following this test, the car retainer valve is set in its "direct release" position to allow the brake cylinder pressure to exhaust preparatory to continuing the test regimen when charging of the car brake equipment to its predetermined test pressure has been completed. Cut-out cocks 106 and 108 are closed following completion of the charging, thereby allowing the standard single car testing to proceed in a manner well-known to those skilled in the railroad braking art and without test plate 58 having any effect except as explained relative to achieving faster testing due to reduced charging time and the ability to conduct a brake cylinder leakage test during such charging time.

I claim:

1. Test apparatus for checking the condition of brake equipment on a railroad car having a brake pipe, a control valve connected to said brake pipe, and a reservoir connected to said control valve, said test apparatus comprising:

a) a source of fluid under pressure;

b) test means interconnected with said source of fluid under pressure and said brake pipe for charging said brake pipe to a predetermined test pressure;

c) said control valve including;

i) a first flow path subject to said brake pipe fluid pressure;

ii) a second flow path interconnected with said first flow path and said reservoir;

iii) choke means in one of said first and second flow paths for controlling service rate of fluid flow between said first and second flow paths;

iv) a first test port connected to said first flow path upstream of said choke means; and v) a second test port connected to said second flow path downstream of said choke means such that said first and second test ports bypass the choke means; and d) means for establishing fluid pressure communication between said first and second test ports.

2. Test apparatus as recited in claim 1, wherein said means for establishing fluid pressure communication between said first and second test ports comprises:

a) a fluid pressure conduit between said first test port and said second test port; and b) a cut-out cock in said conduit.

3. Test apparatus as recited in claim 2, wherein said control valve further comprises:

a) first means for normally interrupting fluid pressure communication via said first test port; and b) second means for normally interrupting fluid pressure communication via said second test port.

4. Test apparatus as recited in claim 3, wherein said means for establishing fluid pressure communication between said first and second test ports further comprises a test plate affixed to said control valve including:

a) first and second channels via which said first and second test ports are communicated with said conduit; and b) first and second actuator means housed in said first and second channels respectively for opening said first and second interrupter means only when said test plate is affixed to said control valve.

5. Test apparatus as recited in claim 4, wherein said control valve further comprises:

a) an access housing via which said test plate is connected to said control valve, said access housing having first and second through passages via which said first and second test ports are interconnected with said first and second channels respectively; and b) said first and second interrupter means comprising respective first and second normally closed check valves.

6. Test apparatus as recited in claim 5, wherein said means for establishing fluid pressure communication between said first and second test ports further includes readout means for monitoring the fluid pressure of said brake pipe and said reservoir.

7. Test apparatus for checking the condition of brake equipment on a railroad car having a brake pipe, a control valve connected to said brake pipe, an auxiliary reservoir connected to said control valve, and an emergency reservoir connected to said control valve, said test apparatus comprising:

a) a source of fluid under pressure;

b) test means interconnected between said source of fluid pressure and said brake pipe for charging said brake pipe to a predetermined test pressure;

c) said control valve including:

i) a first flow path subject to said brake pipe fluid pressure;

ii) a second flow path interconnected with said first flow path and said auxiliary reservoir;

iii) a third flow path interconnected with said second flow path and said emergency reservoir;

iv) choke means in one of said first and second flow paths;

v) a first test port connected to said first flow path upstream of said choke means and thereby bypassing the choke means;

vi) a second test port connected to said second flow path downstream of said choke means and thereby bypassing the choke means;

vii) a third test port connected to said third flow path downstream of said choke means thereby bypassing the choke means; and d) means for establishing fluid pressure communication between said first, second and third test ports.

8. Test apparatus as recited in claim 7, wherein said means for establishing fluid pressure communication between said first, second and third test ports comprises:

a) first, second and third conduits connected respectively to said first, second and third test ports;

b) a common conduit to which each said first, second and third conduit is connected;

c) a first cut-out cock in said common conduit between said connection of said first and second conduits therewith; and d) a second cut-out cock in said common conduit between said connection of said second and third conduits therewith.

9. Test apparatus as recited in claim 8, wherein said control valve further comprises first, second and third means for normally interrupting fluid pressure communication via said first, second and third test ports respectively.

10. Test apparatus as recited in claim 9, wherein said means for establishing fluid pressure communication between said first, second and third test ports further comprises a test plate affixed to said control valve comprising:

a) first, second and third channels via which said first, second and third test ports are interconnected to said first, second and third conduits respectively; and b) first, second and third actuator means housed in said first, second and third channels respectively for opening said first, second and third interrupter means only when said test plate is affixed to said control valve.

11. Test apparatus as recited in claim 10, wherein said control valve further comprises:

a) an access housing via which said test plate is affixed to said control valve, said access housing having first, second and third through passages via which said first, second and third test ports are interconnected with said first, second and third channels respectively;

b) said first, second and third interrupter means comprising respective first, second and third normally closed check valves.

12. Test apparatus as recited in claim 11, wherein said means for establishing fluid pressure communication between said first, second and third test ports further includes readout means for monitoring the fluid pressure of said brake pipe, said auxiliary reservoir and said emergency reservoir.

13. Test apparatus for checking the condition of brake equipment on a railroad car having a brake pipe, a control valve connected to said brake pipe, a reservoir connected to said control valve and a brake cylinder connected to said control valve, said test apparatus comprising:

a) a source of fluid under pressure;

b) test means interconnected with said source of fluid under pressure and said brake pipe for charging said brake pipe to a predetermined test pressure;

c) said control valve including:

i) a first flow path subject to said brake pipe fluid pressure;

ii) a second flow path connected to said brake cylinder;

iii) a first test port connected to said first flow path; and iv) a second test port connected to said second flow path; and d) connecting means for establishing fluid pressure communication between said first and second test ports.

14. Test apparatus as recited in claim 13, wherein said connecting means comprises:

a) a fluid pressure conduit connected between said first test port and said second test port; and b) a cut-out cock in said conduit.

15. Test apparatus as recited in claim 14, wherein said control valve further comprises:

a) first means for normally interrupting fluid pressure communication via said first test port; and b) second means for normally interrupting fluid pressure communication via said second test port.

16. Test apparatus as recited in claim 15, wherein said means for establishing fluid pressure communication between said first and second test ports further comprises a test plate affixed to said control valve including;

a) first and second channels via which said first and second test ports are communicated with said conduit; and b) first and second actuator means housed in said first and second channels respectively for opening said first and second interrupter means only when said test plate is affixed to said control valve.

17. Test apparatus as recited in claim 16, wherein said control valve further comprises:

a) an access housing via which said test plate is connected to said control valve, said access housing having first and second through passages via which said first and second test ports are interconnected with said first and second channels respectively; and b) said first and second interrupter means comprising respective first and second normally closed check valves.

18. Test apparatus as recited in claim 17, wherein said connecting means includes readout means for monitoring the fluid pressure of said brake pipe and said brake cylinder.

19. Test apparatus as recited in claim 13, wherein said control valve further includes:

a) a third flow path interconnected with said first flow path and said auxiliary reservoir;

b) choke means in one of said second and third flow paths;

c) said first test port connected to said first flow path upstream of said choke means; and d) a third test port connected to said third flow path downstream of said choke means.

20. Test apparatus as recited in claim 19 wherein said connecting means further establishes fluid pressure communication between said first and third test ports.

21. Test apparatus as recited in claim 20, wherein said connecting means further comprises:

a) first, second and third conduits connected respectively to said first, second and third test ports;

b) a common conduit to which each said first, second and third conduit is connected;

c) a first cut-out cock in said common conduit between said connection of said first and second conduits therewith; and d) a second cut-out cock in said common conduit between said connection of said second and third conduits therewith.

22. Test apparatus as recited in claim 21, wherein said control valve further comprises:

a) first means for normally interrupting fluid pressure communication via said first test port;

b) second means for normally interrupting fluid pressure communication via said second test port; and c) third means for normally interrupting fluid pressure communication via said third test port.

23. Test apparatus as recited in claim 22, wherein said connecting means further comprises a test plate affixed to said control valve including:

a) first, second and third channels via which said first, second and third test ports are communicated with said first, second and third conduits respectively; and b) first, second and third actuator means housed in said first, second and third channels respectively for opening said first, second and third interrupter means only when said test plate is affixed to said control valve.

24. Test apparatus as recited in claim 22, wherein said control valve further comprises:

a) an access housing via which said test plate is connected to said control valve, said access housing having first, second and third through passages via which said first, second and third test ports are interconnected with said first, second and third channels respectively; and b) said first, second and third interrupter means comprising respective first, second and third normally closed check valves.

25. Test apparatus as recited in claim 24 wherein said connecting means further includes readout means for monitoring the fluid pressure of said brake pipe, said brake cylinder and said reservoir.

* * * * *